(12) United States Patent
Vanel

(10) Patent No.: US 10,696,200 B2
(45) Date of Patent: Jun. 30, 2020

(54) TRIM ELEMENT COMPRISING A SUPPORT SURFACE POSITIONABLE IN A PLURALITY OF POSITIONS

(71) Applicant: FAURECIA INTERIEUR INDUSTRIE, Nanterre (FR)

(72) Inventor: Eric Vanel, Novilliers (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 50 days.

(21) Appl. No.: 15/962,813

(22) Filed: Apr. 25, 2018

(65) Prior Publication Data

US 2018/0312090 A1    Nov. 1, 2018

(30) Foreign Application Priority Data

Apr. 26, 2017  (FR) ..................................... 17 53614

(51) Int. Cl.
| | |
|---|---|
| *B60N 2/75* | (2018.01) |
| *B60R 13/02* | (2006.01) |
| *B60N 2/22* | (2006.01) |
| *B60N 2/04* | (2006.01) |
| *B60N 2/02* | (2006.01) |
| *B60N 2/06* | (2006.01) |
| *B60N 2/18* | (2006.01) |

(52) U.S. Cl.
CPC .............. *B60N 2/77* (2018.02); *B60N 2/0252* (2013.01); *B60N 2/04* (2013.01); *B60N 2/06* (2013.01); *B60N 2/18* (2013.01); *B60N 2/22* (2013.01); *B60N 2/773* (2018.02); *B60N 2/78* (2018.02); *B60R 13/0237* (2013.01); *B60R 13/0243* (2013.01)

(58) Field of Classification Search
CPC ... B60N 2/78; B60N 2/77; B60N 2/04; B60N 2/22; B60N 2/773; B60N 2/0252; B60N 2/06; B60N 2/18; B60R 13/0243; B60R 13/0237
See application file for complete search history.

(56) References Cited

U.S. PATENT DOCUMENTS

2004/0164577 A1    8/2004  Shabana et al.

FOREIGN PATENT DOCUMENTS

| DE | 102006013112 A1 | 9/2007 |
|---|---|---|
| DE | 102007022331 A1 | 11/2008 |
| FR | 2876065 A1 | 4/2006 |

OTHER PUBLICATIONS

DE102006013112A1 computer translation from EPO website.*
French Preliminary Search Report in French for application FR1753614, dated Nov. 28, 2017, 2 pages.

* cited by examiner

*Primary Examiner* — D Glenn Dayoan
*Assistant Examiner* — Melissa Ann Bonifazi
(74) *Attorney, Agent, or Firm* — Reising Ethington P.C.

(57) ABSTRACT

A trim element having a trim panel that includes an inner face and an outer face and at least one support element extending over the inner face and protruding toward the outer face such that the trim panel marries at least part of the contour of the support element in order to form a support surface on the outer face. The support element can be positioned in a plurality of positions relative to the trim panel, which is deformable to marry at least part of the contour of the support element so that the support surface can be positioned in a plurality of areas of the outer face.

10 Claims, 2 Drawing Sheets

TRIM ELEMENT COMPRISING A SUPPORT SURFACE POSITIONABLE IN A PLURALITY OF POSITIONS

TECHNICAL FIELD

The present invention relates to a vehicle trim element, comprising a trim panel comprising an inner face and an outer face forming the outer surface of the trim element and at least one support element extending over the inner face of the trim panel and protruding toward the outer face such that the trim panel marries at least part of the contour of the support element in order to form a support surface on the outer face of the trim panel.

The invention also relates to a vehicle interior comprising such a trim element.

BACKGROUND

Such a trim element is for example intended to form a door panel for a vehicle, such as a motor vehicle.

Such a door panel is generally adjacent to a seat of the vehicle, and it is known to provide the door panel with a support surface forming an armrest such that the passenger seated in the seat can rest his elbow or arm for greater comfort.

The support surface is for example formed by a support element protruding from the door panel or by a local deformation of the door panel so as to form a raised area forming a support surface.

In the first case, it is possible to provide that the support element is movable between different positions in order to adapt the position of the support surface to the morphology of the passenger and/or the position of the seat in which the passenger is seated. However, the appearance of such a door panel is not satisfactory because the support element is not harmoniously integrated into the door panel and forms an element attached on the latter.

In the second case, the door panel has a satisfactory appearance because the support surface is integrated into the outer surface of the door panel, such that there is a continuity of appearance between the outer surface of the door panel and the support surface. However, the comfort of the armrest is reduced, since the position of the support surface is fixed and cannot be adapted to the morphology of the passenger and/or the position of the seat relative to the support surface.

SUMMARY

One of the aims of the invention is to offset these drawbacks by proposing a trim element having a satisfactory appearance and a support surface whose position can be modified.

To that end, the invention relates to a trim element of the aforementioned type, wherein the support element can be positioned in a plurality of positions relative to the trim panel, said trim panel being deformable to marry at least part of the contour of the support element in all positions of the support element so that the support surface can be positioned in a plurality of areas of the outer face.

By positioning the support element on the inner face side, only the trim panel is visible from the outside of the trim element. Thus, there is a continuity of appearance between the outer surface and the support surface, which improves the appearance of the vehicle interior. The support element being movable into different positions and the trim panel being deformable to adapt to the position of the support element, the position of the support surface can be adapted to the morphology of the passenger and/or to the position of the seat in order to improve the ergonomics and comfort of the support surface.

According to other features of the trim element according to the invention, considered alone or according to any technically possible combination:
- the trim panel is reversibly deformable such that the trim panel regains its initial shape in the area where the support element was situated when the support surface is moved from a position in said area to a position in another area of the trim panel;
- the trim element further comprises at least one actuator arranged to position the support element in its different positions, said actuating element being controlled by a control device;
- the support element is translatable between its different positions; and
- the support element is translatable along at least two axes substantially perpendicular to each other.

The invention also relates to a vehicle interior comprising at least one seat, comprising a seat bottom and a seatback, and a trim element as described above, the trim panel being adjacent to the seat such that the support surface forms an armrest for the passenger seated in the seat.

According to other features of the vehicle interior according to the invention, considered alone or according to any technically possible combination:
- the seat bottom and/or the seatback are movable between different adjustment positions, the position of the support element depending on said adjustment positions.
- the seat bottom and/or the seatback are movable in rotation and/or translation between the different adjustment positions.
- the movement of the seat bottom and/or the seatback between the adjustment positions is controlled by the control device such that the movement of the seat bottom and/or the seatback and the positioning of the support element are synchronized.

BRIEF DESCRIPTION OF THE DRAWINGS

Other aspects and advantages of the invention will appear upon reading the following description, provided as an example, and done in reference to the appended drawings, in which.

DETAILED DESCRIPTION OF THE ILLUSTRATED EMBODIMENT

In the description, the term "inner" is defined by that which is facing the body of the vehicle, and the term "outer" refers to that which is facing the passenger compartment of the vehicle.

Figure 1:
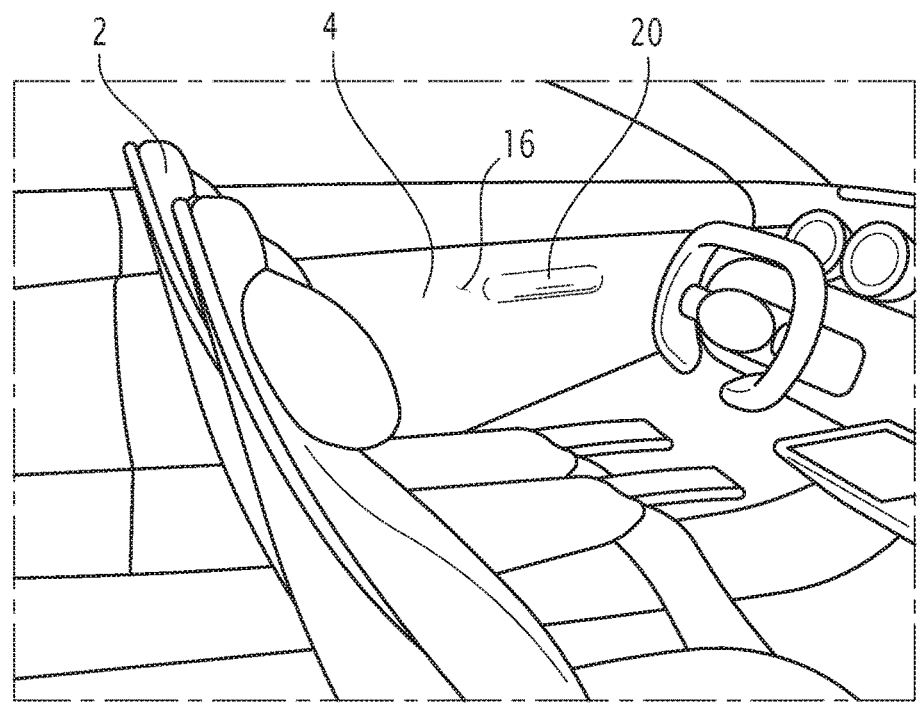
FIG. 1 is a schematic perspective illustration of a vehicle interior according to the invention.

In reference to FIG. 1, a vehicle interior, or trim assembly, is described comprising at least a seat 2 and a trim element 4 adjacent to the seat. According to the embodiment shown in the figures, the trim element 4 is a door panel intended to trim the door of the vehicle adjacent to the seat 2. It is, however, understood that the invention is not limited to a trim element forming a door panel and could be applied to other types of trim elements, for example the trim of a center console or of an element extending between the two rear seats of the vehicle.

Figure 4:
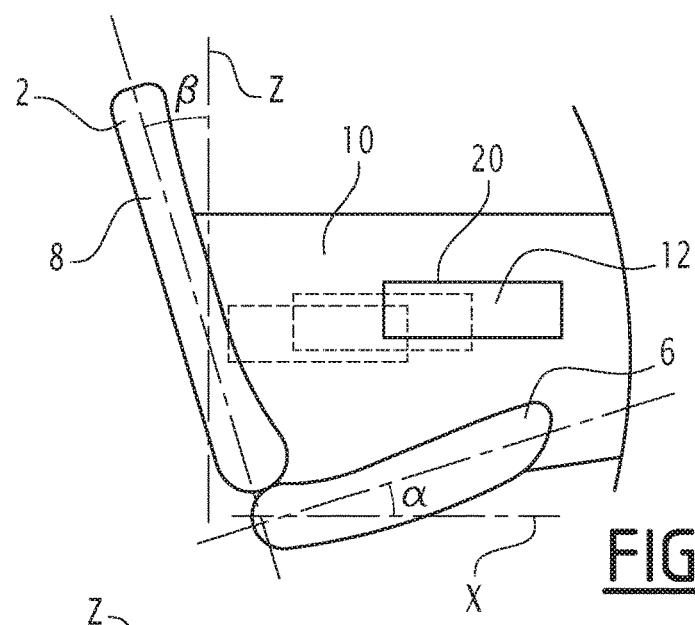
FIGS. 4 to 6 are schematic side illustrations of the vehicle interior of FIG. 1 in different positions of the support element and the seat.
Figure 5:
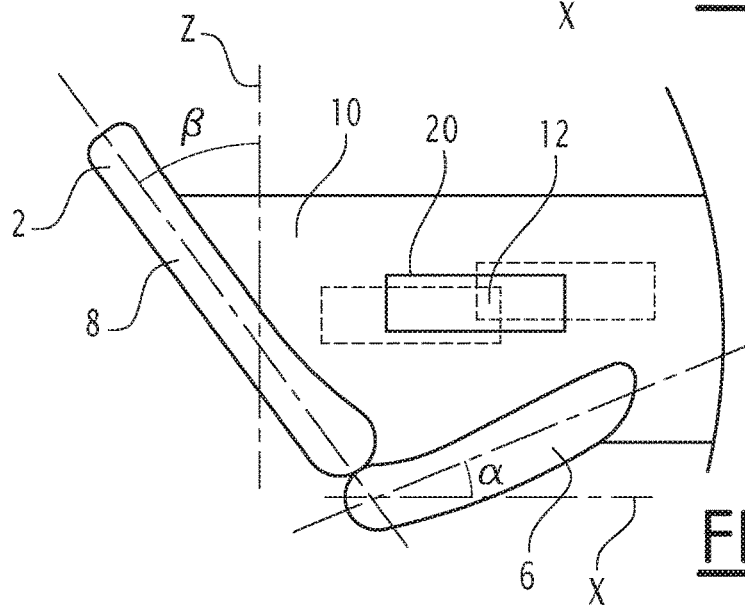
Figure 6:
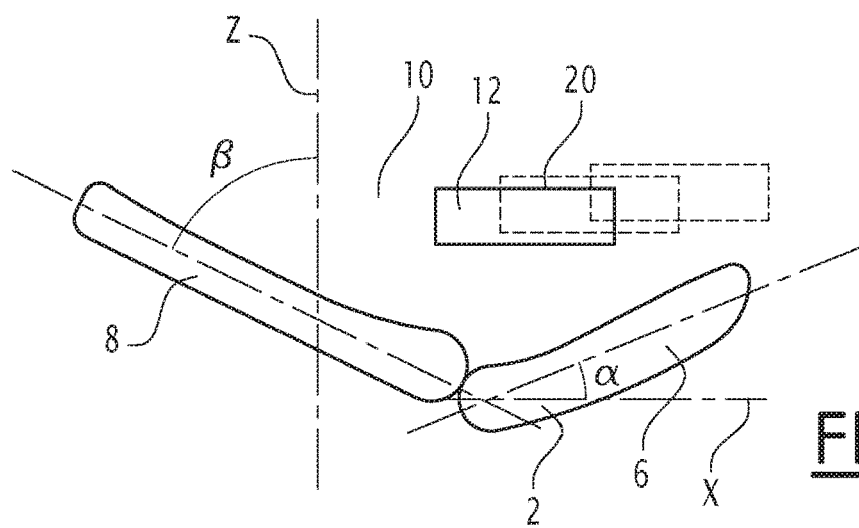

The seat 2 traditionally comprises a seat bottom 6, on which a passenger is intended to be seated, and a seatback 8, against which the passenger's back can rest. The position of the seat 2 is adjustable so as to modify its position in the passenger compartment, for example to move it farther away from or closer to the steering wheel of the vehicle, in the case of the driver's seat. To that end and as is known in itself, the seat bottom 6 of the seat 2 is for example mounted translatably on rails (not shown) secured to the floor of the vehicle and extending in the front-back direction of the vehicle, called longitudinal direction X. Thus, the entire seat can be moved in the longitudinal direction by adjusting the position of the seat bottom 6 relative to the rails. Also traditionally, the incline of the seat bottom 6 and/or the seatback 8 is adjustable. Thus, the angle α between the seat bottom 6 and the longitudinal direction X and/or the angle β between the seatback 8 and the elevation direction Z of the vehicle are adjustable so as to vary the incline of the seat as desired by the passenger. FIGS. 4 to 6 show different inclines of the seat 2 by varying the incline of the seat bottom 6 and/or the seatback 8. According to one embodiment, the incline of the seat bottom 6 and the seatback 8 can be adjusted independently of each other according to one operating mode and in a synchronized manner according to another operating mode. Thus, the user can adjust the incline of the seat bottom 6, the seatback 8, respectively, without altering that of the seatback 8, that of the seat bottom 6, respectively, according to one operating mode. According to another operating mode, the change of the incline of the seat bottom 6, the seatback 8, respectively, causes a corresponding change in the seatback 8, the seat bottom 6, respectively.

Thus, the seat 2 can be placed in a plurality of adjustment positions allowing the user to adapt the seat to his morphology and/or in order to place it in a particular position, such as a driving position (FIG. 4) or an elongated position (FIG. 6) for example.

The position of the seat 2 is for example adjusted using an electric control device controllable by the user of the seat 2.

The trim element 4 comprises at least one trim panel 10 and at least one support element 12.

The trim panel 10 has an inner face 14, facing the body of the vehicle, and an outer face 16, facing the passenger compartment of the vehicle and forming the outer surface of the trim element 4, i.e., the surface visible by the passengers of the vehicle. In the case of a trim element forming a door panel, the inner face 14 of the trim panel faces the door of the vehicle on which the trim element is installed. The outer face 16 forming the visible surface of the trim element, the latter has the appearance one wishes to impart to the trim element. Thus, the trim panel can be made from a material making it possible to impart this appearance or may comprise a covering arranged to have the desired appearance and forming the outer face 16 of the trim panel 10. According to the embodiment shown in FIGS. 2 and 3, the trim panel 10 is formed by a single layer, but it is understood that it may comprise one or several inner layers, for example forming a support, and at least one covering layer arranged to impart its appearance to the outer face 16 of the trim panel 10.

Irrespective of its structure, the trim panel 10 is reversibly deformable at least in a certain area of the trim panel 10, as will be described later. According to one embodiment, the trim panel 10 is made from one or several resilient materials at least in a certain area thereof.

Figure 2:
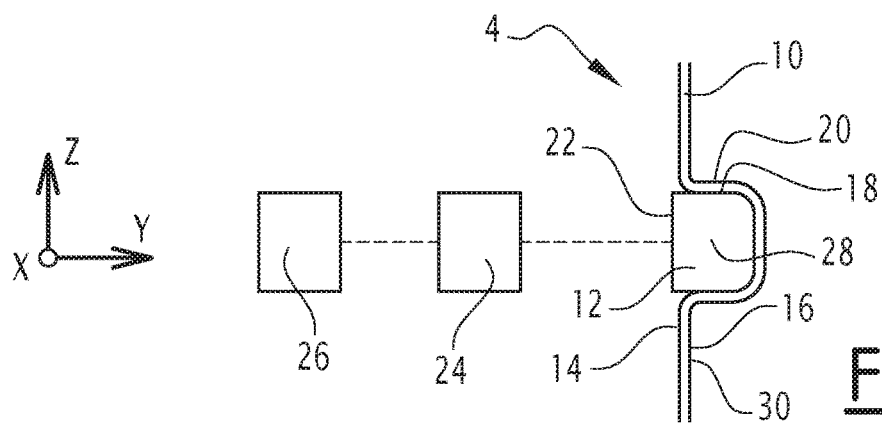
FIG. 2 is a schematic sectional illustration of the trim assembly of the vehicle interior of FIG. 1, the support element being in a first position.
Figure 3:
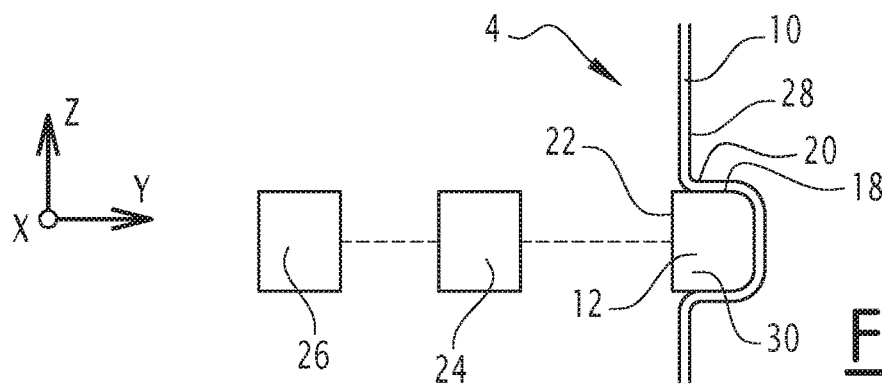
FIG. 3 is a schematic sectional illustration of the trim assembly of FIG. 2, the support element being in a second position.

The support element 12 is positioned on the side of the inner face 14 of the trim panel 10 and comprises at least one support face 18 extending in the trim panel 10 so as to locally deform the latter so that the outer face 16 of the trim panel 10 comprises a support surface 20 protruding from the rest of the outer face 16, as shown in FIGS. 2 and 3. The support surface 20 is substantially parallel to the support face 18 of the support element 12 and is obtained by the deformation of the trim panel 10 by the support element 12. In other words, the support element 12 "sinks" into the inner face 14 in a part of the deformable area of the trim panel 10 such that the support face 18 locally deforms the trim panel to form a support surface 20 protruding relative to the rest of the outer face 16. Protruding means that the support surface 20 extends in a different plane from the plane(s) in which the rest of the trim panel 10 extends. More particularly, the support surface 20 is substantially complementary to the support face 18, i.e., the support surface 20 marries the shape of the support face 18. For example, in the case of a door panel, the outer face 16 extends at least partly in a main plane, defined by an axis extending in the longitudinal direction X and by an axis extending in the elevation direction Z and the support surface 20 extends in a plane substantially perpendicular to the main plane and defined by an axis extending in the longitudinal direction X and by an axis defined by a transverse direction Y, substantially perpendicular to the longitudinal direction X and the elevation direction Z and corresponding to the direction of the width of the vehicle.

Outside the support face 18, the support element can have any desired shape intended to form a relief with the desired shape in the outer face 16, as shown by FIG. 1. Indeed, the trim panel 10 is arranged to be deformed so as to marry at least part of the contour of the support element such that the trim panel has the shape of the contour that it marries in the area where the support element 12 sinks into the trim panel 10. For example, the support element shown in FIGS. 2 and 3 has a substantially parallelepiped shape and the trim panel 10 marries the shape of five of the six faces of the support element 12, only the inner face 22 not being covered by the trim panel 10.

The support face 18 of the support element 12 is rigid enough and has a mechanical strength such that it is able to withstand a substantial bearing force in the elevation direction, such that a passenger can press his elbow or arm on the support surface 20 without deformation or breaking of the support face 18 under the effect of this force. The support element 12 can further be arranged to be crushed under the effect of a force applied in the transverse direction so as to retract in case of impact on the door of the vehicle, and thus not to injure the passenger occupant. According to one example embodiment, the support element 12 is made in a single piece of a rigid material, such as a plastic material, and can be weakened appropriately to have the desired behavior in the transverse direction. According to other embodiments, the support element 12 can be made in several segments, as will be described later.

The support element 12 can be positioned in a plurality of positions relative to the trim panel 10, as shown in FIGS. 2 to 6. Able to be positioned in a plurality of positions means that the bearing surface 20 can extend in different locations, or different areas, of the outer face 16 of the trim panel, i.e.

the position of the bearing surface 20 in the outer face 16 is modifiable and can be adapted to the user's needs, as will be described later.

According to one embodiment, the support element 12 is movable relative to the trim panel 10 in its plurality of positions so as to move the support face 18 relative to the trim panel 10. The support element 12 is for example translatable along two axes relative to the trim panel 10 so as to make it possible to position the support surface 20 in different areas of the outer face 16. According to one embodiment, the support element 12 is translatable in a longitudinal direction and in an elevation direction such that the position of the support surface 20 can be modified in the front-back direction and along the height of the trim element 4, as shown in FIGS. 2 to 6, in which the support element 12 is positioned in different positions. Such a movement can be obtained using an actuator 24 arranged to move the support element 12 on a guide rail moving on another guide rail (not shown) secured to the structure on which the trim element 4 is mounted, one of the rails extending in the longitudinal direction and the other extending in the elevation direction. The actuator 24 is controlled by a control device 26, which in turn is controlled by the user so that this user can adjust the position of the support surface 20 based on his morphology and/or his position in the vehicle, as will be described later. This embodiment is for example appropriate when the support element 12 is made in a single piece.

In addition to the movement along the two axes, the support element 12 may further be stationary or movable in the transverse direction. If the support element 12 is stationary in the transverse direction, the width of the support surface, i.e., the distance over which the support surface 20 extends protruding from the outer face 16, is fixed. If the support element 12 is movable in the transverse direction, for example using a jack-type actuator, the width of the support surface 20 can be adjusted to be larger or smaller.

Alternatively or additionally, the support element 12 is rotatable around a transverse axis in order to make it possible to adjust the incline of the support surface 20 relative to the outer face 10.

If the support element 12 is made in several segments, each segment is for example movable between a retracted position, in which the segment does not sink into the trim panel, and a support position, in which the segment sinks into the trim panel 10 such that the upper face of this segment forms a support surface part 20 in the outer face 16. The segments are positioned adjacent to one another in the entire area where a support surface must be able to be positioned. Thus, the support element 12 for example comprises one or several lines of segments in the longitudinal direction, the lines extending above one another in the elevation direction. By placing at least one of the segments of a line in the support position and the other segments in the retracted position, it is thus possible to form a support surface 20 located in the outer face 16. To modify the position of the support surface 20, it suffices to move the segment in the support position toward the retracted position and to move at least one other segment in the retracted position to the support position. To modify the height of the support surface 20, at least one segment of another line is placed in the support position, while the segment(s) initially in the support position are placed in the retracted position. The support surface 20 can be more or less extended by placing a greater or smaller number of adjacent segments of a same line in the support position.

The segments can each be formed from a rigid material and be translatable in the transverse direction by jack-type actuators 24 between the retracted and support positions. Alternatively, each segment is for example formed by an inflatable element that it suffices to inflate to place in the support position and to deflate to place in the retracted position. In this case, the actuators are for example of the pneumatic type. The actuators are controlled by the control device 26, which in turn is controlled by the user so that this user can adjust the position of the support surface 20 based on his morphology and/or his position in the vehicle, as will be described later.

The trim panel 10 is arranged to deform in the location where the support element 12 is positioned when it is sunk into the trim panel, as previously described. This deformation is reversible, i.e., the trim panel 10 is arranged to regain its initial shape in the area where the support surface 10 was situated when it is formed in another area of the trim panel.

The outer face 16 of the trim panel 10 for example extends substantially in a main plane containing an axis extending in the longitudinal direction X and an axis extending in the elevation direction Z outside the area where the support surface 20 extends. In a first area 28 where the support surface 20 extends, the trim panel 10 has a three-dimensional shape substantially complementary to that of the support element 12, as shown in FIG. 2. When the support surface 20 is formed in a second area 30, the first area 28 regains the shape of the rest of the trim panel, i.e., the outer face 16 extends in the main plane in the first area 28, while the second area 30 adopts the shape of the support element 12, as shown in FIG. 3. Thus, the outer face 16 of the trim panel 10 has a satisfactory appearance in all positions of the support surface 20.

Such a reversible deformation is for example obtained by making the trim panel from a resilient material, at least in the area where the support surface is intended to be positioned in its different positions. Alternatively, the deformation could be plastic, in which case the trim element 4 is provided with means for returning the trim panel to its initial shape when the support element 12 is moved into another area, for example suction means of the trim panel.

As previously indicated, the control device 26 is controlled by the user so that it can position the support surface 20 in the appropriate location, depending on the user's morphology and position in the vehicle. More particularly, the user's position is determined by that of the seat 2. Thus, according to one embodiment, the movement of the support surface 20 can be synchronized with that of the seat 2 such that changing the position of the seat, for example its incline, causes a corresponding change in the position of the support surface 20. In this case, the control device 26 for example makes it possible both to command the actuator(s) 24 of the trim element 10 and the position of the seat. In this case, the control device 26 for example comprises a single interface with which the user interacts to adjust the position of the seat 2, while the support surface 20 moves automatically as a function of this adjustment. Thus, as shown in FIGS. 4 to 6, the movement of the support surface 20 depends on the position of the seat, and in particular the incline of the seat bottom 6 and/or the seatback 8. Thus, in the driving position, as shown in FIG. 4, the support element 12 is rather placed at a height and toward the front in the trim panel 10, while in the elongated position, as shown in FIG. 6, the support element 12 is rather placed toward the bottom and the rear in the trim panel 10.

It may further be provided to adjust the position of the support surface 20 independently of that of the seat. Indeed, this adjustment can be useful to adapt the position of the support surface 20 to the morphology of different users, while the position of the seat is not necessarily modified. To that end, the control device 26 is for example arranged to operate in a synchronized mode in which a change of the position of the seat 2 causes a change of the position of the support surface 20 and in a desynchronized mode in which the position of the support surface 20 can be modified independently of that of the seat 2.

The inside of the vehicle described above makes it possible to adapt the position of the seat and that of the armrest for increased postural comfort for a large segment of the population, for example from the fifth percentile to the ninety-fifth percentile of the population.

The change in the position of the support surface 20 is done without deterioration to the aesthetic appearance of the trim element, since the latter retains a uniform appearance irrespective of the position of the support surface 20.

The invention claimed is:

1. A vehicle trim element, comprising a trim panel comprising an inner face and an outer face forming the outer surface of the trim element and at least one support element comprising a support face extending over the inner face of the trim panel and protruding toward the outer face such that the trim panel marries at least part of the contour of the support element in order to form a support surface on the outer face of the trim panel, wherein the support element can be positioned in a plurality of positions relative to the trim panel, said trim panel being deformable to marry at least part of the contour of the support element, including the support face, in all positions of the support element so that the support surface can be positioned in a plurality of areas of the outer face.

2. The trim element according to claim 1, wherein the trim panel is reversibly deformable such that the trim panel regains its initial shape in the area where the support element was situated when the support surface is moved from a position in said area to a position in another area of the trim panel.

3. The trim element according to claim 1, wherein the support element is translatable between its different positions.

4. The trim element according to claim 3, wherein the support element is translatable along at least two axes substantially perpendicular to each other.

5. A vehicle interior comprising at least one seat, comprising a seat bottom and a seatback, and a trim element according to claim 1, the trim panel being adjacent to the seat such that the support surface forms an armrest for the passenger seated in the seat.

6. The vehicle interior according to claim 5, wherein the seat bottom and/or the seatback of the seat are movable between different adjustment positions, the position of the support element depending on said adjustment positions.

7. The vehicle interior according to claim 6, wherein the seat bottom and/or the seatback are movable in rotation and/or translation between the different adjustment positions.

8. The vehicle interior according to claim 6, wherein the trim element further comprises at least one actuator arranged to position the support element in its different positions, said actuator being controlled by a control device, and wherein the movement of the seat bottom and/or the seatback between the adjustment positions is commanded by the control device such that the movement of the seat bottom and/or the seatback and the positioning of the support element are synchronized.

9. A vehicle trim element, comprising a trim panel comprising an inner face and an outer face forming the outer surface of the trim element and at least one support element comprising a support face extending over the inner face of the trim panel and protruding toward the outer face such that the trim panel marries at least part of the contour of the support element in order to form a support surface on the outer face of the trim panel, wherein the support element can be positioned in a plurality of positions relative to the trim panel, said trim panel being deformable to marry at least part of the contour of the support element, including the support face, in all positions of the support element so that the support surface can be positioned in a plurality of areas of the outer face, wherein the vehicle trim element further comprises at least one actuator arranged to position the support element in its different positions, said actuator being controlled by a control device.

10. A vehicle trim element, comprising a trim panel comprising an inner face and an outer face forming the outer surface of the trim element and at least one support element comprising a support face extending over the inner face of the trim panel and protruding toward the outer face such that the trim panel marries at least part of the contour of the support element in order to form a support surface on the outer face of the trim panel, wherein the support element can be positioned in a plurality of positions relative to the trim panel, said trim panel being deformable to marry at least part of the contour of the support element, including the support face, in all positions of the support element so that the support surface can be positioned in a plurality of areas of the outer face, wherein the support element is translatable along at least two axes substantially perpendicular to each other.

* * * * *